United States Patent
Zhang et al.

(10) Patent No.: US 11,551,825 B2
(45) Date of Patent: Jan. 10, 2023

(54) SPHERICAL ELEMENT DETECTING AND POSITIONING DEVICE FOR A PEBBLE BED NUCLEAR REACTOR

(71) Applicant: TSINGHUA UNIVERSITY, Beijing (CN)

(72) Inventors: Haiquan Zhang, Beijing (CN); Junfeng Nie, Beijing (CN); Xin Wang, Beijing (CN); Hongke Li, Beijing (CN); Liguo Zhang, Beijing (CN); Jiguo Liu, Beijing (CN); Zuoyi Zhang, Beijing (CN); Yujie Dong, Beijing (CN)

(73) Assignee: Tsinghua University, Beijing (CN)

( * ) Notice: Subject to any disclaimer, the term of this patent is extended or adjusted under 35 U.S.C. 154(b) by 0 days.

(21) Appl. No.: 17/261,845

(22) PCT Filed: Sep. 19, 2019

(86) PCT No.: PCT/CN2019/106665
§ 371 (c)(1),
(2) Date: Jan. 20, 2021

(87) PCT Pub. No.: WO2020/140485
PCT Pub. Date: Jul. 9, 2020

(65) Prior Publication Data
US 2021/0296014 A1   Sep. 23, 2021

(30) Foreign Application Priority Data
Dec. 30, 2018   (CN) .......................... 201811644039.1

(51) Int. Cl.
*G21C 19/20*   (2006.01)
*G21C 1/07*   (2006.01)
(Continued)

(52) U.S. Cl.
CPC ............. *G21C 19/202* (2013.01); *G21C 1/07* (2013.01); *G21C 17/06* (2013.01); *G21C 17/066* (2013.01); *G21C 19/20* (2013.01); *G21C 19/06* (2013.01)

(58) Field of Classification Search
CPC ........ G21C 19/02; G21C 19/06; G21C 19/10; G21C 19/19; G21C 19/20; G21C 19/202;
(Continued)

(56) References Cited

U.S. PATENT DOCUMENTS 5,459,767 A    10/1995   Lessing
2003/0112919 A1*  6/2003  Davies ................. G21C 17/066
                                                              376/381

FOREIGN PATENT DOCUMENTS

CN    102097144 A    6/2011
CN    102522130 A    6/2012
(Continued)

OTHER PUBLICATIONS

PCT International Search Report for PCT/CN2019/106665 with English translation, dated Dec. 3, 2019, 6 pages.
(Continued)

*Primary Examiner* — Darlene M Ritchie
(74) *Attorney, Agent, or Firm* — Morris O'Bryant Compagni Cannon, PLLC

(57) ABSTRACT

The present disclosure relates to the field of reactor engineering technologies, and particularly to a spherical element detecting and positioning device. The spherical element detecting and positioning device includes a pressure-bearing casing, an internal member and an execution part; the pressure-bearing casing includes a tank body, one sphere inlet adapter pipe and two sphere outlet adapter pipe respectively arranged on the tank body; the internal member is arranged in the rotor counter-bored hole and includes a
(Continued)

lining ring and a limit ring; and the execution part includes a turntable and two support lugs. The spherical element detecting and positioning device provided by the present disclosure can achieve triple functions of performing automatic material separation, precise positioning and directional conveyance of spherical elements, has compact structure and simple control, and can meet the operation reliability and maintainability requirements for long-term and intermittent operation under the strong radioactive environment.

10 Claims, 4 Drawing Sheets

(51) Int. Cl.
*G21C 17/06* (2006.01)
*G21C 19/06* (2006.01)

(58) Field of Classification Search
CPC .... G21C 19/207; G21C 17/06; G21C 17/066; G21C 17/063; G21C 1/07; Y02E 30/30
USPC .................. 376/265, 266, 381, 382
See application file for complete search history.

(56) References Cited

FOREIGN PATENT DOCUMENTS

| CN | 102750996 | A | * | 10/2012 | ............... G21C 1/07 |
| CN | 102750996 | B | * | 5/2013 | ........... G21C 19/202 |
| CN | 103745757 | A | | 4/2014 | |
| CN | 103762000 | A | | 4/2014 | |
| CN | 103778981 | A | | 5/2014 | |
| CN | 103778982 | A | | 5/2014 | |
| CN | 106782716 | A | | 5/2017 | |
| CN | 207367616 | U | | 5/2018 | |
| CN | 108726161 | A | | 11/2018 | |
| CN | 109785985 | A | | 5/2019 | |
| DE | 3904113 | A1 | | 8/1990 | |
| GB | 935130 | A | | 8/1963 | |

OTHER PUBLICATIONS

PCT Written Opinion for PCT/CN2019/106665, dated Dec. 3, 2019, 4 pages.

\* cited by examiner

SPHERICAL ELEMENT DETECTING AND POSITIONING DEVICE FOR A PEBBLE BED NUCLEAR REACTOR

CROSS-REFERENCE

The present application is a national phase entry under 35 U.S.C. § 371 of PCT/CN2019/106665 filed on Sep. 19, 2019 which claims priority to Chinese Patent Application No. 2018116440391, filed on Dec. 30, 2018, entitled "Spherical Element Detecting and Positioning Device", each of which is incorporated herein by reference in its entirety.

FIELD OF TECHNOLOGY

The present application relates to the field of reactor engineering technologies, and particularly to a spherical element detecting and positioning device.

BACKGROUND

A pebble bed high temperature gas-cooled reactor employs the on-line continuous multi-pass refueling strategy with spherical fuel elements, the running and operating of a fuel loading and unloading system will directly affect the reactivity change of the reactor. An on-line burnup measurement device measures the burnup of the fuel elements unloaded from the core. The elements that have not reached the target burnup are returned to the core, and the spent fuel elements that have reached the target burnup level are unloaded into a spent fuel storage tank. The HTR-10 high temperature gas-cooled experimental reactor is equipped with an lifter at the downstream of a damage fuel separator to cooperate with the burnup measurement device to perform burnup measurement. The lifter performs dual functions of positioning distribution of burnup measurement and pneumatic conveyance. The lifter has to be interlocked with the damage fuel separator at the upstream, and it is greatly affected by the downstream airflow, therefore it cannot meet the operating requirements for the burnup measurement and directional conveyance of a large number of spherical elements in commercial power plants.

In order to meet the high-frequency cycling requirement of the core fuel elements, equipment assemblies and pipes for performing functions of pipeline temporary storage, single conveyance, positioning of burnup measurement, directional distribution, pneumatic conveyance, and etc. are arranged on the pebble bed modular high temperature gas-cooled reactor commercial nuclear power plants after core unloading and crushed spheres sorting, so as to decouple the burnup measurement from the functions of core unloading and pneumatic conveyance, thereby improving the reliability of the system, equipment and control.

A device for accurately positioning the spherical elements to be measured is disposed at the burnup measurement point of the fuel loading and unloading system, and is matched with a collimator of the burnup measurement device, so that a high-activity y spectrometer can be used to measure the burnup on-line. Since the on-line burnup measurement is based on the y-spectrum energy of the relevant nuclides, the radiation effects of adjacent spherical elements must be excluded. On the other hand, the measurement times of the spherical elements with different burnup are different, while the unloading speed of the upstream unloading device is basically constant. Therefore, a certain number of spherical elements must be temporarily stored in the pipe sections waiting for burnup measurement. In order to accurately measure the burnup of the spherical elements one by one to ensure the reliability and stability of automatic operations such as unloading, burnup measurement, directional conveyance and etc., in addition to the radiation measurement device and the distributor, corresponding spherical element control device must be arranged at the upstream of the sphere flow pipeline.

Burnup measurement is a key process for the automatic operation of the fuel loading and unloading system and even the pebble bed high temperature reactor, and it involves a plurality of devices mentioned above and many control points. These devices work in a high-temperature, high-pressure, and radioactive helium environment. Especially, for the single conveyor or the spacer conveyor, the burnup measurement positioner and the steering gear, the daily number of operations reaches 3000, 3000 and 200 times respectively in an HTR-PM demonstration project, which brings great challenges to the thermal fit and tolerance of the moving parts, friction and wear of the shafting with the oil-free lubricant bearings, the sealing of highly permeable helium at the pressure boundary, the interlocking control of the devices and fault tolerance, etc.

SUMMARY

(I) Technical Problem to be Solved

One objective of the present disclosure is to provide a spherical element detecting and positioning device that can achieve triple functions of automatic material separation, precise positioning and directional conveyance of spherical elements.

(II) Technical Solutions

In order to solve the technical problem above, the present disclosure provides a spherical element detecting and positioning device, including a pressure-bearing casing, an internal member and an execution part;

the pressure-bearing casing includes a tank body, one sphere inlet adapter pipe and two sphere outlet adapter pipes respectively arranged on the tank body; one rotor counter-bored hole, one collimating counter-bored hole, one sphere inlet through hole and two sphere outlet through holes are arranged in the tank body; the sphere inlet through hole communicates with the sphere inlet adapter pipe, the two sphere outlet through holes correspondingly communicate with the two sphere outlet adapter pipes, respectively, and the sphere inlet through hole and the sphere outlet through hole respectively communicate with the rotor counter-bored hole;

the internal member is arranged in the rotor counter-bored hole, and includes a lining ring which is a ring structure with a notch, both ends of the lining ring are connected with an arc-shaped limit ring; a cross-section of the limit ring is smaller than that of the lining ring, and a rotation gap is provided between an outer surface of the limit ring and an inner surface of the rotor counter-bored hole; the limit ring is provided with a sphere inlet hole passage which communicates with the sphere inlet through hole; the lining ring is provided with two sphere outlet hole passages that are correspondingly in communication with the two sphere outlet through holes respectively;

the execution part includes a turntable and two support lugs; the turntable is arranged in the lining ring of the internal member and is able to rotate within the lining ring; a sphere-passing through hole penetrating in a radial direction is provided in the turntable, and the two support lugs are mounted on the front and back sides of the sphere-passing through hole, and the two support lugs are able to rotate in the rotation gap; the two support lugs are both in inverted L shape and opposite to each other, and an isolation space is provided between the two support lugs; a side corresponding to the collimating counter-bored hole of the turntable is provided with a thinning groove; when the turntable is at a detecting position, a groove bottom surface of the thinning groove is parallel to a bottom surface of the collimating counter-bored hole, and a projected circle of the collimating counter-bored hole on the bottom surface of the thinning groove is enveloped by the bottom surface of the thinning groove.

Specifically, the execution part further includes a rotating shaft connected to the turntable through a spline.

Specifically, a limit groove is provided on the turntable, and a limit post matching the limit groove is provided on the tank body.

Specifically, the pressure-bearing casing further includes an end face flange connected to the tank body through a first fastening assembly, and a first sealing assembly is provided between the end face flange and the tank body.

Further, the device also includes a transmission part including an outer magnetic assembly, an isolation hood arranged in the outer magnetic assembly, and an inner magnetic assembly arranged in the isolation hood; the rotating shaft is arranged in the inner magnetic assembly.

Specifically, the transmission part further includes a support arranged outside the outer magnetic assembly; the support is connected to the end face flange through a second fastening assembly, and the isolation hood cooperates with the support through a flange.

Specifically, a second sealing assembly is provided between the end face flange and the transmission part.

Further, the device also includes a power part including a motor, a reducer connected to the motor, and a coupling connected to the reducer; the coupling is connected to the rotating shaft.

Specifically, the power part further includes a shield sleeve in which the motor, the reducer and the coupling are arranged.

Specifically, the shield sleeve is connected and fixed to the support.

(III) Advantageous Effects

The technical solutions above of the present disclosure have the following advantages.

The spherical element detecting and positioning device provided by the present disclosure uses a turntable with support lugs and a sphere-passing through hole to achieve the separation and single conveyance functions of the spherical elements in strings, so as to eliminate the mutual influence between adjacent spherical elements. By arranging the thinning groove on the turntable and arranging the collimating counter-bored hole in the tank body, the accurate positioning is achieved and thus the cooperative measurement precision is ensured. Through the cooperative arrangements of the spherical element conveying passages between the pressure-bearing casing, the internal member and the execution part, the directional distribution of the spherical elements after detection is achieved.

The spherical element detecting and positioning device provided by the present disclosure integrates the functions of material separation, single conveyance, measurement positioning, directional distribution and etc. Compared with the prior art, the spherical element detecting and positioning device has compact structure, small space occupation, significantly reduced IO control points, saved cost and higher operational reliability.

Compared with the existing lifter, the spherical element detecting and positioning device provided by the present disclosure has a high operation efficiency, has no jamming impact and zero drift, no control logic interlocking, and is not affected by the upstream sphere flow conveying speed and the downstream air flow. Therefore, the operational reliability and maintenance safety are higher.

Figure 1:
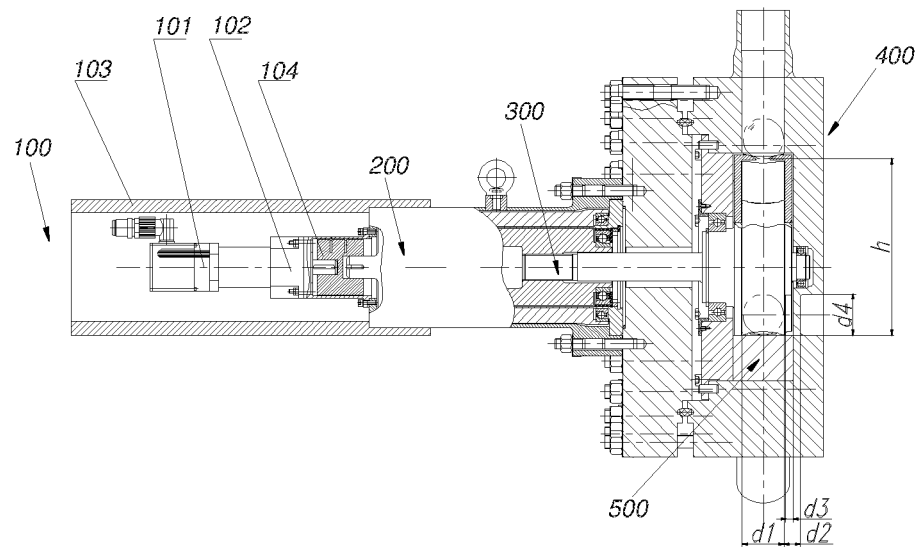
FIG. 1 is a structural schematic diagram of the spherical element detecting and positioning device according to an embodiment of the present disclosure.
Figure 2:
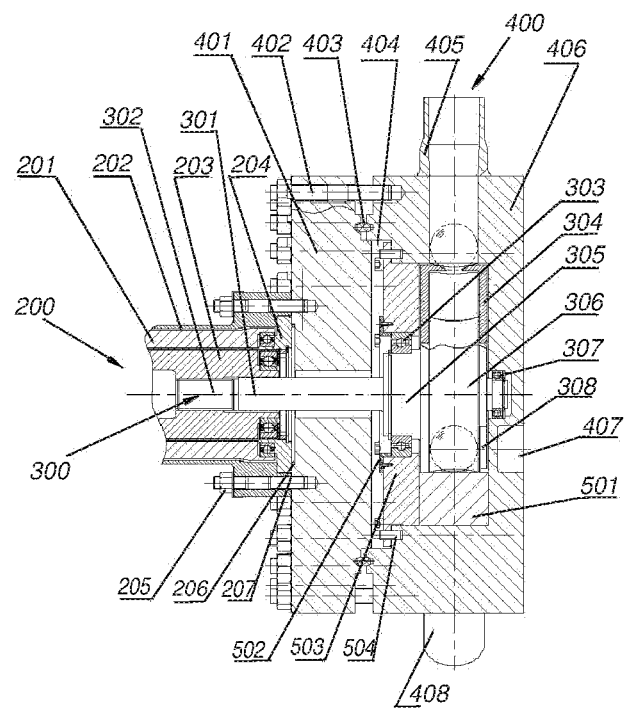
FIG. 2 is a structural schematic diagram of the transmission part, the execution part and the pressure-bearing casing in the spherical element detecting and positioning device according to an embodiment of the present disclosure.
Figure 3:
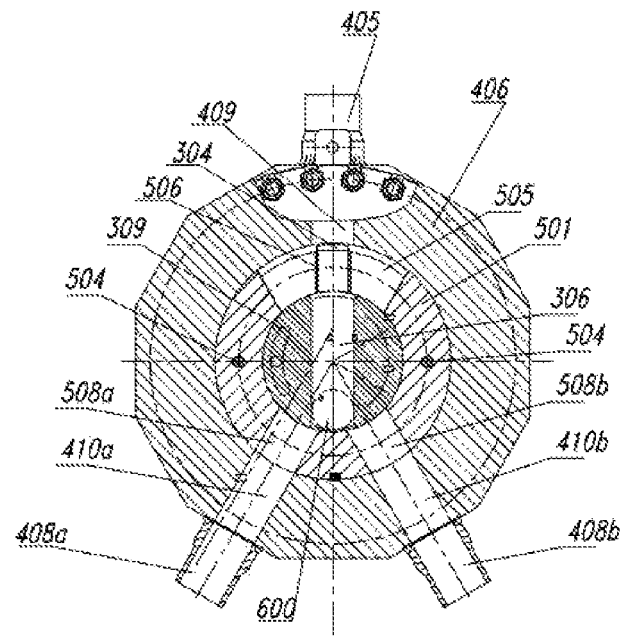
FIG. 3 is a partial sectional view of the tank body of the spherical element detecting and positioning device according to an embodiment of the present disclosure.

In the drawings:
100 power part; 101 AC servo motor; 102 planetary gear reducer; 103 shield sleeve; 104 metal coupling;
200 transmission part; 201 outer magnetic assembly; 202 support; 203 inner magnetic assembly; 204 isolation hood; 205 second fastening assembly; 206 second sealing assembly; 207 flange;
300 execution part; 301 spline; 302 rotating shaft; 303 first bearing; 304 support lug; 305 turntable; 306 sphere-passing through hole; 307 second bearing; 308 thinning groove; 309 limit groove; 310 support surface;
400 pressure-bearing casing; 401 end face flange; 402 first fastening assembly; 403 first sealing assembly; 404 rotor counter-bored hole; 405 sphere inlet adapter pipe; 406 tank body; 407 collimating counter-bored hole; 408a first sphere outlet adapter pipe; 408b second sphere outlet adapter pipe; 409 sphere inlet through hole; 410a first sphere outlet through hole; 410b second sphere outlet through hole;
500 internal member; 501 lining ring; 502 bearing press plate; 503 bearing seat; 504 positioning pin; 505 limit ring; 506 sphere inlet hole passage; 508a first sphere outlet hole passage; 508b second sphere outlet hole passage; 509a first eccentric hole passage; 509b second eccentric hole passage; 510 sphere stop surface;

600 spherical element; 601 first spherical element; 602 second spherical element; 603 third spherical element.

DETAILED DESCRIPTION

In order to make the objectives, technical solutions, and advantages of the embodiments of the present disclosure clearer, the technical solutions of the embodiments of the present disclosure will be clearly and completely described with reference to the accompanying drawings of the embodiments of the present disclosure. Obviously, the described embodiments are part but not all of the embodiments of the present disclosure. Based on the embodiments of the present disclosure, all other embodiments obtained by a person of ordinary skill in the art without creative efforts shall fall within the protection scope of the present disclosure.

As shown in FIG. 1 to FIG. 8, the embodiments of the present disclosure provide a spherical element detecting and positioning device, including a power part 100, a transmission part 200, an execution part 300, a pressure-bearing casing 400, and an internal member 500.

The power part 100 comprises an AC servo motor 101, a planetary gear reducer 102, a shield sleeve 103, and a metal coupling 104. Since the AC servo motor 101 has a good torque-frequency characteristic, and its equipped rotary transformer has high-precision resolution, the rotational speed and the rotational angle are precisely controlled by controlling the driver and the rotary transformer to perform rotational angle feedback. The reducer is configured to provide the output torque to ensure the smooth movement of the actuator. Therefore, the servo system can be ensured to meet the rotational angle control requirements of frequent start-stops, smooth operating, and accurate output shaft positioning. The shield sleeve 103 is a steel integrally machined piece, one end of which is positioned with a support 202 of the magnetic transmission part, and is rooted by being supported on the equipment steel frame or the steel platform. The AC servo motor 101 and the planetary gear reducer 102 are disposed in the shield sleeve 103, so as to limit the radial γ-ray cumulative dose of the spherical elements in the surrounding sphere flow pipelines to the electrodes and the reducer.

The transmission part 200 is a cylindrical magnetic transmission with a lag angle of less than 0.2°, and includes a support 202, an outer magnetic assembly 201, an isolation hood 204, an inner magnetic component 203, and etc. The titanium alloy isolation hood 204 is limited and pressed by a flange 207 and the coaxially mounted support 202 flange, and is fastened to an end face flange 401 of the pressure-bearing casing 400 through a second fastening assembly 205 and a second sealing assembly 206, so as to form a complete pressure-bearing boundary together with a tank body 406. The outer magnetic assembly 201 is connected to the planetary gear reducer 102 through a metal coupling 104; the inner magnetic assembly 203 is connected to a rotating shaft 302 of the execution part 300 through a spline. Under the instructions from the nuclear power plant DCS main control system and the servo control driver, the reducer 102 directly connected to the AC servo motor 101 drives the outer magnetic assembly 201 to rotate synchronously. Under the effect of magnetic coupling, the magnetic field penetrates the isolation hood 204 and drives the inner magnetic assembly 203 and the execution part 300 directly connected thereto to rotate synchronously, so as to achieve the flexible mechanical transmission under a non-contact condition, and to transform the dynamic sealing into a static sealing, which not only achieves the sealing of radioactive hot helium, but also improves the operating environment of the power part 100.

During the burnup measurement, both the spherical elements positioned in a through hole 306 of a turntable and on a sphere stop surface 510 of a lining ring 501 of the internal member 500, and the spherical elements 600 in strings stopped on a support surface 310 of the turntable have very strong radioactivity. The magnetic transmission adopts a slim and compact cylindrical structure, and the outer magnetic assembly 201 and the inner magnetic assembly 203 of the magnetic transmission have sufficient shielding thickness in the radial direction in addition to the sufficient shielding thickness in the longitudinal direction, so that the power part 100 can be protected from excessively γ-ray cumulative radiation dose caused by short-time sphere stop. Since the power part 100 is subjected to relatively small oblique instantaneous radioactive radiation during the flow of the spherical elements, a shield sleeve 103 with a small thickness is only needed.

Figure 4:
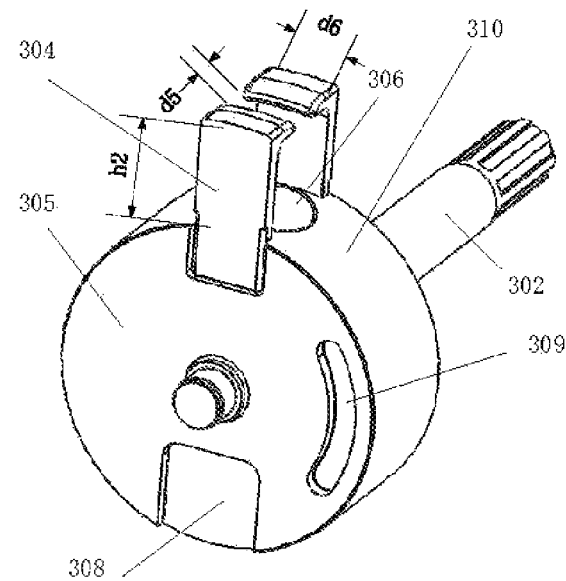
FIG. 4 is a structural schematic diagram of the turntable of the spherical element detecting and positioning device according to an embodiment of the present disclosure.

The execution part 300 comprises a rotating shaft 302, a turntable 305, support lugs 304, and two bearings 303 and 307, as shown in FIG. 4. The rotating shaft 302 and the turntable 305 are an integrally machined piece; the turntable 305 includes a sphere-passing through hole 306; the support lugs 304 each have a shape of "Γ", and have two pieces in total, which are made of high-strength and wear-resistant metal and mounted at both sides of the sphere-passing through hole 306 of the turntable 305 in a mirroring manner, for separating the spherical elements at the lowest end and supporting the spherical elements in strings. A support surface 310 of the sphere-passing through hole 306 and the support lugs 304 is a wear-resistant surface for supporting the spherical elements in strings. The turntable 305 is placed in the lining ring 501 of the internal member 500, and is supported in a bearing seat 503 of the internal member 500 and a rotor counter-bored hole 404 of the tank body 406 by a first bearing 303 and a second bearing 307, respectively.

The pressure-bearing casing 400 includes the end face flange 401, the tank body 406, a sphere inlet adapter pipe 405 and a sphere outlet adapter pipe 408. The tank body 406 includes one rotor counter-bored hole 404, one sphere inlet through hole 409, a first sphere outlet through hole 410a, a second sphere outlet through hole 410b and one collimating counter-bored hole 407.

The sphere inlet adapter pipe 405 coaxially communicates with the sphere inlet through hole 409, the first sphere outlet adapter pipe 408a coaxially communicates with the first sphere outlet through hole 410a, and the second sphere outlet adapter pipe 408b coaxially communicates with the second sphere outlet through hole 410b.

The end face flange 401 is configured to support the magnetic transmission, and is tightly connected to the tank body 406 through a first fastening assembly 402 and a first sealing assembly 403. By disassembling the end face flange 401, the execution part 300 and the internal member 500 can be conveniently installed, disassembled, repaired and replaced.

Figure 5:
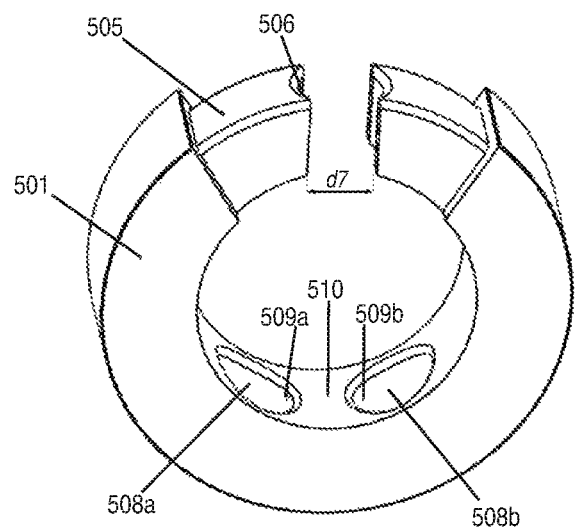
FIG. 5 is a structural schematic diagram of the lining ring and the limit ring of the spherical element detecting and positioning device according to an embodiment of the present disclosure.

The internal member 500 comprises the lining ring 501, a bearing press plate 502, the bearing seat 503 and a positioning pin 504. As shown in FIG. 5, the lining ring 501 includes a limit ring 505, a sphere inlet hole passage 506, a first sphere outlet hole passage 508a and a second sphere outlet hole passage 508b. The bearing press plate 502 and the bearing seat 503 are configured to fix and support the first bearing 303 of the execution part 300. The positioning pin 504 is configured to limit and fix the bearing seat 503 together with fasteners. The internal member 500 is disposed in the rotor counter-bored hole 404 of the tank 406, and the sphere inlet hole passage 506, the sphere inlet through hole 409 and the sphere inlet adapter pipe 405 coaxially communicate. The first sphere outlet hole passage 508a, the first sphere outlet through hole 410a, and the first sphere outlet adapter pipe 408a coaxially communicate. The second sphere outlet hole passage 508b, the second sphere outlet through hole 410b and the second sphere outlet adapter pipe 408b coaxially communicate.

An axis of the sphere inlet through hole 409 of the tank 406 and the collimating counter-bored hole 407 intersect perpendicularly at one point. When the spherical elements 600 stop steadily in the sphere stop surface 510 of the lining ring 501 and the sphere-passing through hole 306 of the turntable 305, the measurement precision is the highest when a spherical center of the spherical element 600 coincides with the intersection point. When the parts are being installed and the equipment is operating, the spherical center of the stopped sphere should be substantially coincident with the intersection point.

During the burnup measurement, detecting rays with good directivity and a certain intensity are emitted through the external burnup measurement and reach the detecting and positioning device, coincide with the axis of the collimating counter-bored hole 307 and penetrate a wall of the collimating counter-bored hole until they steadily stop at the spherical center of the spherical element 600 on the sphere stop surface 510 of the lining ring 501. In order to ensure the measurement precision, the error between the position of the spherical center and the collimating detecting ray is required to be within 1 mm, and the effective diameter of the collimating counter-bored hole is required to be equal to a diameter of the spherical element, and the equivalent wall thickness of the structural steel in the collimating direction is required to be 15 mm or less. In addition, a distance h between adjacent spherical elements must be greater than 200 mm to eliminate the mutual influences between the spherical elements.

As shown in FIG. 1, the diameter of the spherical element is φ61. In order to ensure a smooth sphere flow, an inner diameter of a sphere-passing pipe or a sphere hole passage that relies on gravity for flowing is usually φ65. In this embodiment, in order to ensure an accurate positioning of the spherical element and reduce the measurement errors, a diameter d1 of the sphere-passing through hole 306 of the turntable 305 is set to be φ61, and the sphere inlet through hole 409 of the tank body 406 and the sphere-passing through hole 306 have the same diameter. In addition, a tapered section is provided on the sphere inlet adapter pipe 405 in the pressure-bearing casing 400, and the small end thereof is connected to the sphere inlet through hole 409 of the tank body 406, and has a same diameter with the sphere inlet through hole 409, so as to guide the spherical elements to flow.

In order to meet the requirements of the equivalent diameter and the equivalent wall thickness in the collimating direction, a diameter d4 of the collimating counter-bored hole 407 of the tank body 406 in this embodiment is 60 mm. A thinning groove 308 is provided on one side of the turntable 305 near the collimating counter-bored hole 407 of the tank body. When the turntable 305 is located at the burnup measurement position, a groove bottom surface of the thinning groove 308 is parallel to a bottom surface of the collimating counter-bored hole 407, and a projected circle of the collimating counter-bored hole 407 on the bottom surface of the thinning groove 308 is enveloped by the groove bottom surface of the thinning groove 308, and is in the direction of the axis of the collimating counter-bored hole 407. The effective collimating thicknesses d2 and d3 are 15 mm.

When being in the measurement sphere stop position, the spherical elements in strings are separated by the support lugs 304 and located on a top surface of the support lugs 304, and a distance to the sphere stop surface 510 of the lining ring 501 is h which is about 250 mm in this embodiment. When h is too large, the detecting and positioning device is oversized.

In order to ensure that the support lugs 304 can smoothly separate the spherical elements in strings, and do not damage the spherical elements, and to ensure the debris to smoothly pass, the structure, size and arrangement of the support lugs 304 need to be limited. In this embodiment, a height h2 of the support lugs 304 is equivalent to the diameter of the spherical element, so that transverse plates of the support lugs 304 can precisely pass through a gap of the brightest spherical elements. Since the support lug 304 is in the inverted L shape, if the transverse plates are too wide, it may touch the spherical elements instead of passing through the gap between two spheres; if the transverse plates are too narrow, the strength and rigidity are insufficient. Therefore, in this embodiment, a width d6 of the support lug 304 is slightly greater than a radius of the spherical element. In addition, in this embodiment, the minimum gap d5 between the two support lugs 304 is 20 mm, which is not only convenient for separating the spherical elements, but also can effectively ensure that the debris passes through the gap and enters the sphere-passing through hole 306.

Since the support lugs 304 are distributed at both sides of the turntable 305 in a mirroring manner, in order to facilitate the installation of the turntable 305, a width d7 of the sphere inlet hole passage of the lining ring 501 must be smaller than the spherical elements to restrict the flow of the spherical elements, meanwhile d7 must be greater than the width d6 of the support lugs 304 so as to ensure the smooth assembly and disassembly of the turntable and the support lugs. In this embodiment, the width d6 of the support lug and the width d7 of the sphere inlet hole passage are 30 mm and 40 mm, respectively.

In order to avoid possible dust and debris from depositing on the sphere stop surface 510 of the lining ring 501, the spherical elements to be detected are raised, without affecting the accuracy of the measurement result. A first eccentric hole passage 509a and a second eccentric hole passage 509b connected to each other can be respectively provided on the first sphere outlet hole passage 508a and the second sphere outlet hole passage 508b of the lining ring 501. The sphere stop surface 510 is polished from a concave cylindrical surface to a flat surface or a convex surface. When falling from the sphere-passing through hole 306 of the turntable, the dust or the debris will not be temporarily stored on the sphere stop surface 510 but will directly slip from the eccentric hole passages.

In addition, the tank body 406 and the rotor of turntable 305 are respectively provided with a limit post and a limit groove 309 which are matched, and an angle of the limit points at both ends is 60°. On the one hand, the movement range of the rotation angle of the turntable 305 can be limited, and on the other hand, it is convenient for the AC servo system to use its torque mode to achieve the position calibration so as to ensure the positioning precision of the positioning distributor.

The first bearing 303 and the second bearing 307 of the execution part 300, and the internal bearing of the magnetic transmission are heat-resistant and wear-resistant alloy bearings with polyimide cages. The polyimide cage having radiation resistance and self-lubrication properties provides a solid lubricating film, and the heat-resistant and wear-resistant alloy has better plasticity and toughness than ceramic bearings, thereby meeting the long-life operation requirements of bearing temperature resistance and radiation resistance.

Figure 6:
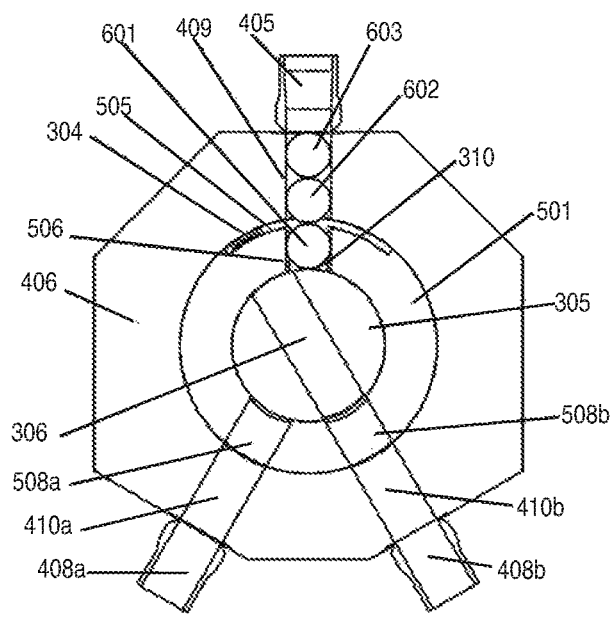
FIG. 6 is a diagram of the first working position of the spherical element detecting and positioning device according to an embodiment of the present disclosure.
Figure 7:
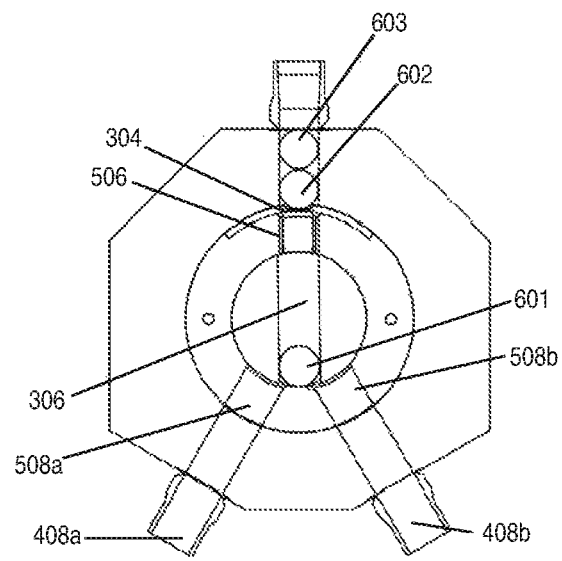
FIG. 7 is a diagram of the second working position of the spherical element detecting and positioning device according to an embodiment of the present disclosure.
Figure 8:
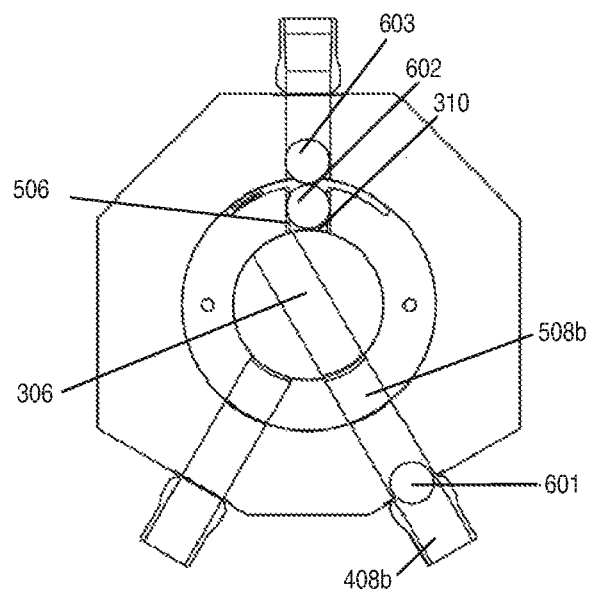
FIG. 8 is a diagram of the third working position of the spherical element detecting and positioning device according to an embodiment of the present disclosure.

According to the burnup measurement results, the detecting and positioning device according to the present disclosure operates in a short-term continuous working mechanism under the DCS instruction, and its cyclic working process is: receiving spherical elements→rotating and separating the spherical elements→positioning measurement-→directionally distributing→receiving the spherical elements, the working principle is shown in FIG. 6 to FIG. 8. In FIG. 6, the turntable 305 is in a static sphere receiving position. At this time, the sphere-passing through hole 306 and the support lugs 304 are located at a left limit point or a right limit point, and the spherical elements from the upstream will be temporarily stored in series in the sphere inlet adapter pipe 405 and the sphere inlet through hole 409 of the tank body, and be supported by the support surface 310 of the turntable. The turntable 305 starts to rotate after receiving the instruction. The support lugs 304 pass through the gap between the spherical elements 601 and 602. When the turntable reaches a middle position, the spherical elements 602 and 603 in series are lifted up, meanwhile the separated spherical element 601 enters the sphere-passing through hole 306 of the turntable under gravity, and stops on the sphere stop surface 510 of the lining ring 501, as shown in FIG. 7. After the spherical elements stop steadily, the burnup measurement can be performed. During the measurement, the spherical elements from the upstream will rest on the spherical element 603 and be supported by the support lugs 304. After the burnup measurement is completed, according to the measurement results and the DCS instructions, the turntable is turned to the left or to the right, and the measured spherical elements are directionally conveyed to the pipeline in the direction of the core or the spent fuel storage. At the same time, the turntable is returned to the sphere receiving position, and the spherical elements 602 and 603 in series drop onto the support surface 310 of the turntable, as shown in FIG. 8.

In summary, the spherical element detecting and positioning device described in the embodiments of the present disclosure can achieve triple functions of performing automatic material separation, precise positioning and directional conveyance of spherical fuel elements, has compact structure and simple control, and can meet the operation reliability and maintainability requirements for long-term and intermittent operation under the strong radioactive environment.

In the description of the present disclosure, it should be noted that, the terms "connected with" and "connected to" should be understood in a broad sense unless otherwise specified and limited, for example, they may be fixed connections, detachable connections, or integrated connections; they can be mechanical connections or electrical connections; they can be direct connections or indirect connections through intermediate mediums. For those of ordinary skill in the art, the specific meanings of the above terms in this disclosure can be understood according to specific situations.

In the description of the present disclosure, unless otherwise stated, "several" means one or more; "multiple" means two or more. The orientation or position relations indicated by the terms "upper", "lower", "left", "right", "inner", "outer" and etc. are based on the orientation or position relations shown in the drawings, and are only for the convenience of describing the present disclosure and simplifying the description, rather than indicating or implying that the referred device or element must have a specific orientation, be constructed and operated in a specific orientation, and therefore cannot be understood as limiting the present disclosure.

Finally, it should be noted that the embodiments above are only used to illustrate rather than limit the technical solutions of the present disclosure. Although the present disclosure has been described in detail with reference to the foregoing embodiments, those of ordinary skills in the art should understand that they can still modify the technical solutions described in the various embodiments above, or equivalently replace some of the technical features thereof; and these modifications or replacements do not depart the essence of the corresponding solutions from the spirit and scope of the technical solutions of the various embodiments of the present disclosure.

The invention claimed is:

1. A spherical element detecting and positioning device, comprising a pressure-bearing casing, an internal member and an execution part;
   wherein the pressure-bearing casing comprises a tank body, one sphere inlet adapter pipe and two sphere outlet adapter pipes respectively arranged on the tank body; one rotor counter-bored hole, one collimating counter-bored hole, one sphere inlet through hole and two sphere outlet through holes are arranged in the tank body; the sphere inlet through hole communicates with the sphere inlet adapter pipe, the two sphere outlet through holes correspondingly communicate with the two sphere outlet adapter pipes respectively, and the sphere inlet through hole and the sphere outlet through holes respectively communicate with the rotor counter-bored hole;
   the internal member is arranged in the rotor counter-bored hole, and comprises a lining ring which is a ring structure with a notch, both ends of the lining ring are connected with an arc-shaped limit ring; a cross-section of the limit ring is smaller than that of the lining ring, and a rotation gap is provided between an outer surface of the limit ring and an inner surface of the rotor counter-bored hole; the limit ring is provided with a sphere inlet hole passage which communicates with the sphere inlet through hole; the lining ring is provided with two sphere outlet hole passages that correspondingly communicates with the two sphere outlet through holes respectively;
   the execution part comprises a turntable and two support lugs; the turntable is arranged in the lining ring of the internal member and is able to rotate within the lining ring; a sphere-passing through hole penetrating in a radial direction is provided in the turntable, and the two support lugs are mounted on the front and back sides of the sphere-passing through hole, and the two support lugs are able to rotate in the rotation gap; the two support lugs are both in inverted L shape and opposite to each other, and an isolation space is provided between the two support lugs; a side corresponding to the collimating counter-bored hole of the turntable is provided with a thinning groove; when the turntable is at a detecting position, a groove bottom surface of the thinning groove is parallel to a bottom surface of the collimating counter-bored hole, and a projected circle of the collimating counter-bored hole on the bottom surface of the thinning groove is enveloped by the groove bottom surface of the thinning groove.

2. The spherical element detecting and positioning device of claim 1, wherein the execution part further comprises a rotating shaft connected to the turntable through a spline.

3. The spherical element detecting and positioning device of claim 1, wherein a limit groove is provided on the turntable, and a limit post matching the limit slot is provided on the tank body.

4. The spherical element detecting and positioning device of claim 2, wherein the pressure-bearing casing further comprises an end face flange connected to the tank body through a first fastening assembly, and a first sealing assembly is provided between the end face flange and the tank body.

5. The spherical element detecting and positioning device of claim 4, wherein it further comprises a transmission part comprising an outer magnetic assembly, an isolation hood arranged in the outer magnetic assembly, and an inner magnetic assembly arranged in the isolation hood; the rotating shaft is arranged in the inner magnetic assembly.

6. The spherical element detecting and positioning device of claim 5, wherein the transmission part further comprises a support arranged outside the outer magnetic assembly; the support is connected to the end face flange through a second fastening assembly, and the isolation hood cooperates with the support through a rabbet.

7. The spherical element detecting and positioning device of claim 6, wherein a second sealing assembly is provided between the end face flange and the transmission part.

8. The spherical element detecting and positioning device of claim 6, wherein it further comprises a power part comprising a motor, a reducer connected to the motor, and a coupling connected to the reducer; the coupling is connected to the rotating shaft.

9. The spherical element detecting and positioning device of claim 8, wherein the power part further comprises a shield sleeve in which the motor, the reducer and the coupling are arranged.

10. The spherical element detecting and positioning device of claim 9, wherein the shield sleeve is connected and fixed to the support.

* * * * *